Oct. 20, 1970

FUMITO NAKASHIMA 3,535,074

METHOD AND APPARATUS FOR PURIFYING CRUDE INERT GASES

Filed Oct. 19, 1966

INVENTOR
FUMITO NAKASHIMA

BY Paul M. Craig, Jr.

ATTORNEY

United States Patent Office 3,535,074
Patented Oct. 20, 1970

3,535,074
METHOD AND APPARATUS FOR PURIFYING CRUDE INERT GASES
Fumito Nakashima, Hitachi-shi, Japan, assignor to Hitachi, Ltd., Tokyo, Japan, a corporation of Japan
Filed Oct. 19, 1966, Ser. No. 587,730
Claims priority, application Japan, Oct. 29, 1965, 40/65,965, 40/69,566
Int. Cl. C01d 23/00; B01d 53/02
U.S. Cl. 23—2                                                   9 Claims

ABSTRACT OF THE DISCLOSURE

The present disclosure is directed to a method and apparatus for purifying inert gases containing oxygen as the contaminant therein. According to the present disclosure, a hydrogen-added crude inert gas is contacted with a supported platinum group element catalyst and then with copper and/or nickel, said latter materials absorbing the residual amount of oxygen present in the inert gas.

---

Figure 1:
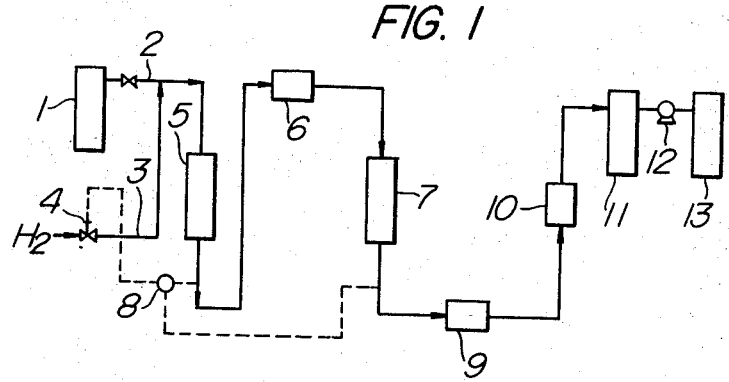

This invention relates to a method and an apparatus for purifying inert gases such as argon, helium, neon and nitrogen. More particularly, the invention pertains to a process for purifying crude inert gases by removing oxygen contained therein.

Inert gases such as argon and the like are widely employed in industries such as shielded arc welding, filling of electric-light bulbs, semiconductor manufacture, specific chemical reactions and metal-refining. In case the inert gases contain oxygen as an impurity, there are frequently brought about undesirable results such as the formation of oxides of materials treated therewith. Therefore, the inert gases are desired to be as pure as possible.

For example, the crude argon, which is recovered in most cases from air-separation plants in conjunction with oxygen and nitrogen, ordinarily contains several percent by volume of oxygen. Since the boiling point of oxygen (182.97° C.) is close to that of argon (185.87° C.), and it is scarcely possible to completely separate the oxygen in the said crude argon by further rectification. Therefore, when the boiling point of an inert gas is close to that of oxygen contained therein as an impurity, the inert gas is purified, at present, according to other purification processes than rectification. As such processes, there are, for example, a catalytic process, according to which oxygen in an inert gas is removed by adding hydrogen into the inert gas and contacting the gas with a noble metal catalyst such as platinum or palladium, thereby converting the oxygen into water, and a process in which oxygen is removed by selectively adsorbing the same with molecular sieves. Generally, the said catalytic process is, however, the most superior.

According to the catalytic process, the amount of hydrogen to be added into a crude inert gas in order to completely convert oxygen contained therein to water should be, in average, more than the equivalent of oxygen. However, the oxygen content in an inert gas from an inert gas-producing plant is variable, in general, and therefore it is quite difficult, in practice, to quickly control the amount of hydrogen to be added in accordance with the variation of oxygen content. Particularly, the lack of an oxygen analyzer having excellent sensitivity and reliability makes more difficult the quick control of the amount of hydrogen to be added. In case the amount of hydrogen is insufficient, unreacted oxygen immediately appears in the purified gas to lower the purity of the inert gas. In order to supplement such drawback, there is sometimes adopted such a procedure that the amount of hydrogen added is made great excess to such an extent that the amount of hydrogen is always sufficient even when there occurs the variation of oxygen content. However, to use expensive hydrogen in more than a required amount is extremely uneconomical. Further, there is a process in which no great excess of hydrogen is used, but a crude inert gas once passed through a catalyst column is again returned to the catalyst column to repeat the purification. In this case, however, there are such questions that the air-tightness of the apparatus should be maintained at a high level and the apparatus is complex, with the result that the high cost of the apparatus is unavoidable.

An object of the present invention is to provide a purification method which is high in purification ability and which is easy in its operations.

Another object is to provide economical purification method and apparatus.

The above objects and other objects of the present invention can be achieved by the process described in detail below.

In accordance with the present invention, there are provided a method for purifying crude inert gases which comprises incorporating into a crude inert gas containing oxygen as an impurity and flowing with variation in oxygen content, hydrogen is at least two times the average content by volume of the oxygen, passing the gas through a supported platinum group element catalyst bed for oxygen-hydrogen recombining, contacting the gas with at least one oxygen-absorbing agent selected from the group consisting of nickel and copper, and subjecting the hydrogen-containing inert gas to rectification to separate hydrogen therefrom, and an apparatus for practicing the above method.

The present invention is characterized in that a hydrogen-added crude inert gas is contacted with a supported platinum group element catalyst and then with copper and/or nickel. In a stationary state, the oxygen in inert gas reacts, by virtue of the platinum group element catalyst, with the added hydrogen and is converted into water. However, in case the oxygen has too extraordinarily increased suddenly in concentration to be removed by the hydrogen fed in a definite amount and unreacted oxygen has passed through the platinum group element catalyst bed, the oxygen is captured by an oxygen-absorbing agent comprising copper and/or nickel, with the result that the appearance (or attendance) of oxygen into the resulting purified gas is perfectly prevented. Of course, there might be some cases where the amount of oxygen passed through from the platinum group element catalyst bed exceeds the absorbing capacity of the oxygen-absorption column packed with copper and/or nickel. In the above case, however, the oxygen is difficultly removed according to any catalytic separation and purification process and hence should be separated by subjecting the gas to rectification or other means. The present invention does not aim to purify a crude inert gas in such cases.

As has been mentioned, a process for purifying an oxygen-containing crude inert gas by adding hydrogen into the gas, passing the gas over a supported catalyst comprising a platinum group element such as platinum, palladium, rhodium, ruthenium, osmium or iridium and reacting the oxygen in the inert gas with the hydrogen added in said gas to convert the oxygen to water is well known. However, the present invention uses a column packed with copper and/or nickel downstream of the platinum group element catalyst, in order to achieve the aforesaid objects. That is, copper and/or nickel are metals which absorb and capture oxygen, and therefore even if an inert gas high in oxygen concentration has been suddenly fed and the unreacted oxygen has passed through the platinum group element catalyst bed because of the lack of the added hydrogen to the oxygen can be effectively absorbed and captured by the copper and/or nickel with the result that the amount of the residual oxygen in the purified gas becomes very little or none. After completion of the sudden flowing of the high oxygen concentration inert gas, the added hydrogen becomes excess against oxygen contained and the oxidized copper and/or nickel are reduced with the excess hydrogen to active metals. Thus, the copper and/or nickel are always regenerated automatically.

From the above, it may be said that the present invention have the following advantages:

In the first place, the operation and maintenance of purification plant become markedly simple. Because, since the absorption column packed with copper and/or nickel is provided in order to absorb and capture the oxygen in an inert gas, no particular attention is required to be paid to the amount of hydrogen to be introduced into the inert gas, and so far as the average value of varying oxygen content has been known, it is sufficient to always add hydrogen in excess of the equivalent to said average oxygen content value.

In the second place, the waste of hydrogen can be greatly minimized. Because, so far as the average oxygen of an inert gas has been known, hydrogen can be fed in as close an amount as possible to the equivalent thereof, and it is substantially unnecessary to always add a great excess of hydrogen, in anticipation of the factor of safety like in the conventional process. It may therefore be said that the present purification method is economical.

In the third place, the amount of hydrogen to be added can be easily and correctly controlled in proportion to the variation in oxygen content of inert gas. It is because, even if the oxygen, which could not be converted into water in the platinum group element catalyst bed, has appeared, the oxygen is captured in the subsequent copper and/or nickel-packed column, and this gives a time enough to know the state that the oxygen content has become higher than the average content and the purification apparatus would fail to completely remove the oxygen.

The platinum group element catalysts and copper and/or nickel employed in the present invention have been selected for the following reasons:

The platinum group element catalysts are catalyst for hydrogen-oxygen recombining, and nearly all of them show excellent catalytic activity at the vicinity of room temperature. Therefore, the use of such catalysts is economical, requiring no substantial heating means or the other catalytic activity-accelerating means.

Copper and nickel are metals employed to absorb and capture oxygen in an inert gas and have been selected in view of their absorption activity, easiness in maintenance and economy.

Only for the absorption and capture of oxygen, there may be used other metals than copper and nickel or liquids employed as oxygen-absorbing agents in laboratories such as solutions of vanadyl sulfate, chromous salt and cuprous salt. These, however, cannot satisfy all the objects of the present invention. Because, they are inferior in absorption activity, cannot be readily regenerated, are uneconomical or are not suitable as oxygen-absorbing agents employed in the purification apparatus to be assembled in an inert gas production plant. Particularly, the liquid agents are difficultly regenerated and are inconvenient for use in a large purification apparatus.

However, such oxygen-absorbing agents as copper and nickel are free from the above drawbacks and have such advantage that they are automatically regenerated during use. In order to promote the absorption activity of copper and nickel, a platinum group element may be incorporated. That is, there may be used an oxygen-absorbing composition comprising, for example, 0.005–0.5% by weight of a platinum group element, 2–50% by weight of copper and a carrier, or one comprising 0.005–0.5% by weight of a platinum group element, 2–50% by weight of nickel and a carrier. Of course, copper and nickel may be used in combination.

The above-illustrated platinum group element catalysts and copper and/or nickel are conveniently used in the form supported on ordinary carriers. Most advantageously, they are dispersed and supported on porous carriers such as, for example, alumina, silica, silica-alumina, magnesia and diatomaceous earth. However, copper and nickel are less expensive than the platinum group element catalysts and hence may be used in the form of metal gauge or fine metal wires without supporting them on carriers. The contents of the platinum group element catalyst are preferably within the range of from 0.05 to 0.5% by weight. In case the amount is less than 0.05% by weight, the volume of catalyst bed becomes excessively large when a required amount of the catalyst has been incorporated into the catalyst bed. On the other hand, the adoption of the amount of more than 0.5% by weight is economically disadvantageous. The above range, however, is an ideal range and the amount of the platinum group element catalyst is not always limited thereto.

The platinum group element catalyst may be dispersed and supported on the carrier according to the ordinary process carried out by impregnating the carrier with a solution of a salt of the metal and drying the composite, followed by thermal reduction in a hydrogen stream.

The amount of copper and/or nickel to be supported on the carrier is preferably within the range of 2 to 50% by weight. In case the amount is less than 2% by weight, the volume of oxygen-absorption column becomes unnecessarily large, while in case the amount is more than 50% by weight, not as much improvement in absorption capacity is obtained.

Copper and nickel are dispersed and supported on carriers according to the following procedures:

(1) A carrier is impregnated with a solution of a copper or nickel salt, and then the composite is reduced with heating in a hydrogen stream.

(2) A carrier is impregnated with a solution of a copper or nickel salt, and the composite is immersed in an alkali solution to form a copper or nickel hydroxide, which is then washed with water, dried, burned and reduced in a hydrogen stream.

(3) A powder of a carrier is mixed with a fine powder of copper or nickel oxide, and the mixed powder is pelletized into a desired shape and is heated and reduced in a hydrogen stream.

(4) A copper or nickel powder is mixed with a carrier powder, and the mixture is pelletized into a desired shape and reduced in a hydrogen stream.

An embodiment of one procedure to disperse and support copper or nickel on a carrier is as follows:

A nitrate, chloride, acetate or sulfate of copper or nickel is dissolved in water, or a carbonate or oxalate of copper and nickel is dissolved in an ammonical water. The solution is used to impregnate a carrier, and the composite is dried and is heated and reduced at 120°–300° C. in a hydrogen stream, either as such or after once heating and calcining at 200°–500° C. in air to form a copper or nickel oxide, whereby the metal can be dispersed and supported on the carrier.

In case a powdery carrier is used, it is preferable that the carrier is impregnated with a catalyst or metal component, and then the mixture is pelletized into grains or tablets or balls of 2–5 mm. in diameter by means of a suitable granulator or pelletizing machine and is then reduced.

The present invention will be illustrated below with reference to the accompanying drawings.

In FIG. 1, 1 is an air separation plant which is able to produce crude inert gas. 2 is a conduit for feeding an inert gas to be purified to a platinum group element catalyst bed 5, 3 is a conduit for feeding hydrogen to said catalyst, 4 is a valve for controlling the feed amount of hydrogen, 6 is a preheater, 7 is an oxygen absorption column packed with cooper or nickel, 8 is a hydrogen analyzer, 9 is a cooler, 10 is a dryer, 11 is a rectifier, 12 is a compression pump, and 13 is a tank for storing a purified inert gas. A crude inert gas from the air-distillation plant 1 is fed through the pipe 2 to the catalyst bed 5. At the same time, hydrogen more than the equivalent of oxygen is fed through the pipe 3. In said catalyst bed, oxygen contained in the crude inert gas is converted into water. The hydrogen-containing inert gas, which has left the catalyst bed 5, is heated, if necessary, in the preheater 6, and is spent to the oxygen absorption column 7. Since the reaction in the catalyst bed 5 is exothermic, the temperature of the catalyst bed increases with increasing oxygen content of the inert gas and added hydrogen. In case the volume of the catalyst bed is large and the removal of the evolved heat is not sufficient, the temperature of the catalyst bed increases to be explosive. In order to avoid such a danger, it is desirable that the catalyst bed be divided into several portions to inhibit the temperature increase as far as possible. In the oxygen absorption column 7, the residual oxygen in the inert gas, which has passed through the catalyst bed is captured. It is needless to say that the capture of oxygen is effected only when the amount of hydrogen has been insufficient, and no absorption and capture of oxygen are carried out in the oxygen absorption column when the amount of hydrogen has been sufficient and hydrogen-oxygen recombining has been completely effected in the catalyst column.

The reactions in the oxygen absorption column are as follows:

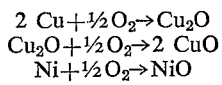

$$2\ Cu + \tfrac{1}{2}O_2 \rightarrow Cu_2O$$
$$Cu_2O + \tfrac{1}{2}O_2 \rightarrow 2\ CuO$$
$$Ni + \tfrac{1}{2}O_2 \rightarrow NiO$$

Even if copper or nickel has temporarily been oxidized, the oxygen absorbing agent is subsequently regenerated by the hydrogen introduction into the column when the oxygen content of feed gas decreases and/or the added hydrogen becomes in excess, with the result that CuO or NiO is reduced to form water.

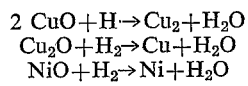

$$2\ CuO + H_2 \rightarrow Cu_2 + H_2O$$
$$Cu_2O + H_2 \rightarrow Cu + H_2O$$
$$NiO + H_2 \rightarrow Ni + H_2O$$

After the oxygen has been captured in the form of water or oxide of copper or nickel, the oxygen free inert gas is introduced, if necessary, into the cooler 9 to condense and remove water contained therein. Subsequently, the inert gas is sent to the dryer 10 and is dried.

The oxygen free inert gas obtained through the above steps ordinarily contains excess hydrogen and hence is sent to the rectifier 11 and is fractionated to separate the excess hydrogen. In the above manners, a high purity inert gas is obtained.

The amount of hydrogen unreacted in an inert gas is detected, by means of, for example, the hydrogen analyzer 8 or the like, at the outlet of the catalyst bed 5 or of the oxygen absorption column 7, and the amount of hydrogen to be added is controlled with the control value 4 so as to be suitable for the amount of oxygen contained in the inert gas.

The oxygen absorption column is preferably maintained at a temperature within the range of 120° to 300° C. This temperature range is suitable for maintaining the absorption activity of copper or nickel as well as for preventing said metals from deterioration.

Figure 2:
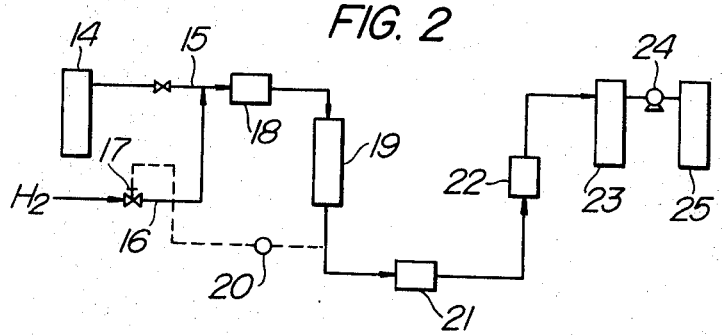

In FIG. 2, 14 is an air-separation plant which is able to produce crude inert gas, 15 is a conduit for feeding a crude inert gas to a catalyst bed and an oxygen absorption column, 16 is a conduit for feeding hydrogen to the column 19, 17 is a valve for controlling the amount of hydrogen to be incorporated, 18 is a preheater, 20 is a hydrogen analyzer, 21 is a cooler, 22 is a dryer, 23 is a rectifier, 24 is a compression pump, and 25 is a tank for storing purified inert gas.

A crude inert gas from the air-separation plant is passed through the conduit 15 and the preheater 18 into the column 19, and hydrogen is fed to the column 19. In the column 19 an oxygen-hydrogen recombining reaction first takes place and when the inert gas passes through a copper and/or nickel layer provided at the lower part of the column, unreacted oxygen, if any, is absorbed and captured. Subsequently, the purified inert gas is cooled in the cooler 21 and water is removed therefrom. After being dried in the dryer 22, the inert gas is separated from hydrogen in the rectifier 23 and is sent to the tank 25 by means of the compression pump 24.

The hydrogen analyzer 20 shown in FIG. 2 is used for the same purpose and in the same manner as in the case of FIG. 1.

The apparatus of FIG. 1 differs from the apparatus of FIG. 2 in that in the latter, the catalyst bed and the oxygen absorption column are connected, whereby the heat generated in the catalyst bed is advantageously utilized with high efficiency in the oxygen absorption column. It is evident in view of the nature of the present invention that in the apparatus of FIG. 2, the catalyst bed should be positioned at the upper part of the oxygen absorption column.

The following examples illustrate the present invention in detail.

EXAMPLE 1

In this example, the purification of an argon gas was effected according to the process shown in FIG. 1.

As the platinum group element catalyst bed 5 and oxygen absorption column 7, there were used cylindrical columns of 20 cm. in inner diameter and 60 cm. in height, and an argon gas was passed therethrough at a rate of 10 m.$^3$/hr. (at STP).

The platinum group element catalyst bed 5 was packed with, as an oxygen-hydrogen recombining catalyst, 5 kg. of a platinum catalyst (platinum content 0.2% by weight, dispersed and supported on an alumina carrier), while the oxygen absorption column with 10 kg. of an oxygen-absorbing agent comprising 15% by weight of copper dispersed on diatomaceous earth, and was maintained at about 250° C.

In the first place, an argon gas containing 1 vol. percent of oxygen was incorporated with 2.5% by volume of hydrogen (in excess of 0.5% by volume based on the amount of oxygen) and was passed through the catalyst bed and oxygen-absorption column, whereby the oxygen content of the gas at the outlet of the oxygen absorption column becomes less than 1 p.p.m. Even when the purification was continued for a long period of time, the oxygen content did not increase and a high purity argon gas was obtained.

In the next place, an argon gas containing 1.5% by volume of oxygen was incorporated with 2.5% by volume of hydrogen and was passed through the catalyst bed and oxygen absorption column under such conditions that 0.5% by volume of hydrogen was wanted, whereby the oxygen content of the gas at the outlet of the oxygen absorption column was less than 1 p.p.m. The above purification was continued for 30 minutes, whereby oxygen began to appear from the oxygen absorption column. Therefore, the amount of hydrogen was increased to 3.5% by volume (in excess of 0.5% by volume based on the amount of oxygen), with the result that the oxygen content became less than 1 p.p.m. Thus, there is a considerable period from the time when the amount of oxygen in the feed argon has increased to the time when the oxygen begins to appear at the outlet of the oxygen absorption column, and therefore the control for increasing the amount of hydrogen added can be effected accurately. In practice, even when the amount of oxygen in an inert gas from an inert gas-producing plant has temporarily increased, the amount again returns to the original average amount, so that not so frequent control in amount of hydrogen added is required. It is needless to say that in case the average amount of oxygen increases or decreases with varying characteristics of the plant, the amount of hydrogen be controlled accordingly.

EXAMPLE 2

In this example, the purification of an argon gas is effected according to the process shown in FIG. 2.

The platinum group element catalyst bed and the oxygen absorption column positioned below said catalyst bed were charged, respectively, with 3 kg. of a platinum catalyst and 5 kg. of an oxygen-absorbing agent prepared by dispersing 15% by weight of copper in diatomaceous earth.

In the first place, an argon gas containing 2% by volume of oxygen was incorporated with 5% by volume of hydrogen (in excess of 1% by volume based on the amount of oxygen) and was flowed in the column 19 at a rate of 0.5 m.³/hr. (at normal temperature and pressure,) whereby the oxygen content of the gas at the outlet of the column 19 become less than 1 p.p.m. Even when the above purification was continued for a long period of time, the oxygen content of the gas at the outlet of the column did not increase.

In the next place, an argon gas containing 3% by volume of oxygen was fed under the conditions that 1% by volume of hydrogen was wanted, whereby the oxygen content of the gas at the outlet of the column was less than 1 p.p.m. However, when the purification was continued for 15 minutes under the above conditions, unreacted oxygen began to appear at the outlet of the column. Therefore, the oxygen content was reduced to 2% by volume within 15 minutes so that the amount of hydrogen was in excess of 1% by volume based on the amount of oxygen, whereby the oxygen content of the gas at the outlet of the column became less than 1 p.p.m. The thus treated argon gas was sent to the rectifier 23 and the argon was separated hydrogen to obtain a high purity argon gas.

EXAMPLE 3

160 g. of copper chloride ($CuCl_2 \cdot 2H_2O$) was dissolved in 1.6 l. of hot water. To the solution, 320 g. of diatomaceous earth was added, and the mixture was heated with stirring to 80–90° C. and was allowed to stand for 1 hour. To the mixture, 600 cc. of an alkali solution containing 140 g. of sodium hydroxide was added, while maintaining the mixture at 80–90° C., to deposit a black brown precipitate. The mixture was allowed to stand for 20 minutes, was charged with about 3 l. of water and was stirred, and then the supernatant was removed by decantation. The above water-washing operation was repeated several times, and then the mixture was filtered. To the filtered cake obtained, 150 cc. of an aqueous acidic solution containing 0.32 g. of palladium chloride was added. The resulting mixture was thoroughly kneaded and was dried at 120–150° C. for about 8 hours to obtain a powder. The powder was then incorporated with a binding agent and a lubricant and was pelletized into the tablets of 4 mm. in diameter and 4 mm. in length. The tablets were heated and burned at 300–400° C. for 2 hours and was subsequently reduced at 120–300° C. in a hydrogen stream to prepare an oxygen-absorbing agent comprising 15% by weight of copper, 0.05% by weight of palladium and diatomaceous earth.

1 kg. of the thus prepared oxygen-absorbing agent was charged in the oxygen absorption column of the apparatus as was shown in FIG. 1, and 300 g. of the same catalyst as in Example 1 was charged in the platinum group element catalyst bed.

In the first place, an argon gas containing 2% by volume of oxygen was incorporated with 5% by volume of hydrogen (in excess of 1% by volume based on the amount of oxygen) and was passed through the catalyst bed and the oxygen absorption column at a rate of 1 m.³/hr. (at normal temp. and press.), whereby the oxygen content of the gas at the outlet of the column became less than 1 p.p.m. Further, no variation in oxygen content was observed for a long period of time.

In the next place, an argon gas containing 3% by volume of oxygen was fed under such conditions that 1% by volume of hydrogen was wanted, whereby the oxygen content of the gas at the outlet of the column became less than 1 p.p.m. After 30 minutes, however, oxygen overflowed, and therefore the amount of hydrogen was increased to 6.5% by volume (in excess of 0.5% based on the amount of oxygen), whereby the oxygen content of the gas at the outlet of the column became less than 1 p.p.m.

I claim:

1. A method for purifying an inert gas containing oxygen as an impurity which comprises introducing hydrogen gas into the inert gas, in excess, in an amount greater than the equivalent of the average amount of oxygen content in the inert gas to be pumped, passing said inert gas containing hydrogen through an oxygen-hydrogen recombining bed packed with a catalyst of a platinum group element to convert the oxygen into water, contacting said inert gas with at least one oxygen absorbing agent selected from the group consisting of copper and nickel to absorb any remaining oxygen from said inert gas by forming the metal oxide, said oxide being capable of being reduced, in situ, to the active state by hydrogen reduction and separating water and hydrogen from the inert gas to produce a pure inert gas substantially free of oxygen.

2. The method of claim 1 wherein the platinum group element is dispersed and supported on a porous carrier, and the nickel or copper is dispersed and supported on a porous carrier.

3. The method of claim 2 wherein the inert gas is contacted with said nickel or copper at a temperature of about 120–300° C.

4. A method according to claim 1, wherein the amount of the platinum group element dispersed and supported on a porous carrier is from 0.05 to 0.5% by weight.

5. A method according to claim 1, wherein the oxygen-absorbing agent comprises 0.05 to 0.5% by weight of a platinum group element, 2 to 50% by weight of copper, and 50.5 to 97.995% by weight of a carrier.

6. A method according to claim 1, wherein the oxygen-absorbing agent comprises 0.005 to 0.5% by weight of a platinum group element, 2 to 50% by weight of nickel, and 50.5 to 97.995% by weight of a carrier.

7. The method of claim 1 wherein the platinum group element is selected from the group consisting of platinum, palladium, rhodium, iridium and osmium.

8. The method of claim 1 wherein the hydrogen gas is added in an amount larger than two times by volume of the average amount of oxygen in the inert gas to be purified.

9. The method of claim 1 wherein the inert gas to be purified contains a fluctuating amount of oxygen.

References Cited

UNITED STATES PATENTS

| | | | |
|---|---|---|---|
| 1,268,692 | 6/1918 | James Dewar et al. | 252—474 |
| 2,582,885 | 1/1952 | Edgar F. Rosenblatt | 23—2 |
| 3,061,403 | 10/1962 | John J. Rendos | 23—2 |
| 3,141,739 | 7/1964 | Harold A. Ohlgren | 23—209 |
| 3,169,845 | 2/1965 | Henry C. Korneman et al. | 23—209 X |

FOREIGN PATENTS

| | | |
|---|---|---|
| 944,207 | 12/1963 | Great Britain. |

OSCAR R. VERTIZ, Primary Examiner

G. O. PETERS, Assistant Examiner

U.S. Cl. X.R.

23—209; 55—66

UNITED STATES PATENT OFFICE
CERTIFICATE OF CORRECTION

Patent No. 3,535,074          Dated October 20, 1970

Inventor(s) Fumito Nakashima

It is certified that error appears in the above-identified patent and that said Letters Patent are hereby corrected as shown below:

On checking the patent document a misprinting was found concerning the claim for priority. The second Japanese priority noted in the patent as "40/69,566" should read 40/65 966.

SIGNED AND SEALED
MAR 9 1971

(SEAL)
Attest:

Edward M. Fletcher, Jr.
Attesting Officer

WILLIAM E. SCHUYLER, JR.
Commissioner of Patents